US012804731B2

(12) United States Patent
Müller et al.

(10) Patent No.: US 12,804,731 B2
(45) Date of Patent: Nov. 17, 2026

(54) ENHANCED EVENT REPORTING FOR MULTIPLE-TRP CELL MOBILITY

(71) Applicant: Telefonaktiebolaget LM Ericsson (publ), Stockholm (SE)

(72) Inventors: Walter Müller, Upplands Väsby (SE); Parisa Pakniat, Solna (SE); Patrik Karlsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 518 days.

(21) Appl. No.: 18/012,170

(22) PCT Filed: Jun. 30, 2020

(86) PCT No.: PCT/SE2020/050683
§ 371 (c)(1),
(2) Date: Dec. 21, 2022

(87) PCT Pub. No.: WO2022/005348
PCT Pub. Date: Jan. 6, 2022

(65) Prior Publication Data
US 2023/0239937 A1 Jul. 27, 2023

(51) Int. Cl.
*H04W 76/10* (2018.01)
*H04L 5/00* (2006.01)
*H04W 24/10* (2009.01)

(52) U.S. Cl.
CPC ........... *H04W 76/10* (2018.02); *H04L 5/0051* (2013.01); *H04W 24/10* (2013.01)

(58) Field of Classification Search
CPC . H04W 76/10; H04W 24/10; H04W 36/0058; H04W 36/0088; H04L 5/0051;
(Continued)

(56) References Cited

U.S. PATENT DOCUMENTS

2015/0181495 A1* 6/2015 Matin .................. H04W 36/38 370/332
2015/0237516 A1* 8/2015 Michel ................. H04W 24/10 370/252
(Continued)

FOREIGN PATENT DOCUMENTS

EP 3273612 A1 1/2018
WO 2018171719 A1 9/2018
(Continued)

OTHER PUBLICATIONS

International Search Report and Written Opinion of the International Searching Authority for PCT International Application No. PCT/SE2020/050683 dated Mar. 19, 2021, 9 pages.
(Continued)

*Primary Examiner* — Candal Elpenord
(74) *Attorney, Agent, or Firm* — Sage Patent Group

(57) ABSTRACT

A method of operating a network node includes establishing a connection to a wireless device from a first transmission/reception point, TRP, that serves a multiple-TRP cell, and configuring the wireless device to generate measurement reports based on a TRP-specific reference signal transmitted by a second TRP that serves the multiple-TRP cell. A method of operating a wireless device includes establishing a connection to a first transmission/reception point, TRP, that serves a multiple-TRP cell, and generating a measurement report based on a TRP-specific reference signal transmitted by a second TRP that serves the multiple-TRP cell. Related devices and computer program products are disclosed.

18 Claims, 14 Drawing Sheets

(58) Field of Classification Search
CPC ..... H04L 5/0048; H04L 5/001; H04L 5/0053; H04B 7/022
USPC .................................................. 370/331–332
See application file for complete search history.

(56) References Cited

U.S. PATENT DOCUMENTS

| | | | | |
|---|---|---|---|---|
| 2018/0199226 | A1 | 7/2018 | Tsai et al. | |
| 2021/0195487 | A1* | 6/2021 | Zhang | H04W 72/23 |
| 2021/0195493 | A1* | 6/2021 | Zhang | H04W 36/324 |
| 2021/0212091 | A1* | 7/2021 | Pezeshki | H04W 72/1268 |
| 2021/0337455 | A1* | 10/2021 | Zhou | H04W 36/0085 |
| 2021/0367728 | A1* | 11/2021 | Park | H04B 7/0695 |
| 2022/0078684 | A1* | 3/2022 | Fehrenbach | H04W 36/0058 |
| 2022/0174567 | A1* | 6/2022 | Awada | H04B 7/06964 |
| 2022/0217597 | A1* | 7/2022 | Ishii | H04W 76/20 |
| 2023/0239752 | A1* | 7/2023 | Balan | H04W 36/0058 370/331 |
| 2023/0276320 | A1* | 8/2023 | Deenoo | H04W 36/0085 370/331 |
| 2023/0389013 | A1* | 11/2023 | Pezeshki | H04W 72/1268 |

FOREIGN PATENT DOCUMENTS

| | | | |
|---|---|---|---|
| WO | 2021071397 | A1 | 4/2021 |
| WO | 2021259458 | A1 | 12/2021 |

OTHER PUBLICATIONS

3GPP TS 36.331 V16.0.0, "3rd Generation Partnership Project; Technical Specification Group Radio Access Network; Evolved Universal Terrestrial Radio Access (E-UTRA); Radio Resource Control (RRC); Protocol specification; (Release 16)," Mar. 2020, Valbonne, France, 1048 pages.

3GPP TS 38.331 V16.0.0, "3rd Generation Partnership Project; Technical Specification Group Radio Access Network; NR; Radio Resource Control (RRC) protocol specification; (Release 16)," Mar. 2020, Valbonne, France, 835 pages.

Nokia et al.; 3GPP TSG RAN WG1 #96bis Meeting; R1-1905064; "Enhancement on Multi-TRP/Panel Transmission"; Xi'an, China; Apr. 8-12, 2019; 18 pages.

Communication pursuant to Article 94(3) EPC mailed Oct. 9, 2024 for European Patent Application No. 20737626.0 , 7 pages.

3GPP TS 25.331 V16.0.0, "3rd Generation Partnership Project; Technical Specification Group Radio Access Network; Radio Resource Control (RRC); Protocol specification; (Release 16)," Mar. 2020, Valbonne, France, 2319 pages.

* cited by examiner

ENHANCED EVENT REPORTING FOR MULTIPLE-TRP CELL MOBILITY

CROSS REFERENCE TO RELATED APPLICATIONS

This application is a 35 U.S.C. § 371 national stage application of PCT International Application No. PCT/SE2020/050683 filed on Jun. 30, 2020, the disclosure and content of which is incorporated by reference herein in its entirety.

TECHNICAL FIELD

The inventive concepts generally relate wireless communication systems, and in particular to accessing of cells supported by multiple transmit/receive points.

BACKGROUND

Many wireless communication networks, such as those that operate according to the 3GPP Long Term Evolution (LTE) and/or New Radio (NR) specifications, provide service over large coverage areas by dividing the coverage areas into small regions, called cells, that are served by different transmission/reception points (TRPs) within a radio access network (RAN) that transmit downlink (DL) signals to, and receive uplink (UL) signals from, mobile wireless devices, or user equipment (UE). As a UE moves through the coverage area, it monitors the strength of signals received from different TRPs to help the network determine when to initiate a handover (HO) of the UE from one cell to another.

A simplified wireless communication system 100 is illustrated in FIG. 1. The system includes a wireless device 10 that communicates with one or more access nodes 20A, 20B using radio connections 17, 18. The access nodes 20A, 20B are connected to a core network node 30. The access nodes 20A-20B, which function as TRPs, are part of a radio access network 15.

For wireless communication systems pursuant to 3GPP 5G System, 5GS (also referred to as New Radio, NR, or 5G) standard specifications, the access nodes 20A-20B correspond typically to a 5G NodeB (gNB) and the network node 30 corresponds typically to either an Access and Mobility Management Function (AMF) and/or a User Plane Function (UPF). The gNB is part of the radio access network 15, which in this case is the NG-RAN (Next Generation Radio Access Network), while the AMF and UPF are both part of the 5G Core Network (5GC).

FIG. 2 is a schematic illustration of one embodiment of a top-level overview of nodes and interfaces in a new generation cellular communication system. The new generation radio access network (NG-RAN) comprises a number of nodes, in this embodiment gNB 20A and gNB 20B. Each NG-RAN node 20A, 20B is associated with at least one TRP. Each NG-RAN node can support one or several cells where each cell can use one or several TRP's for transmission and reception. The Access Management Function/User Plane Function (AMF/UPF) 35 are provided in network nodes 30 of the core of the 5th generation (5GC). The AMF/UPF 35 communicates with the gNB 20A and gNB 20B via an NG interface 32. The gNB 20A and gNB 20B may communicate internally in the NG-RAN by the Xn interface 22.

Cells are typically, but not always, served by a single TRP, which transmits reference symbols that allow a UE to detect, identify, measure and report cell candidates to the network according to network configured rules.

For example, in NR systems, each TRP broadcasts a Synchronization Signal Block (SSB) which includes the Physical Cell Identity (PCI) of the cell served by the TRP and other information needed by the UE to acquire more information to access the network. The SSB provides the NR Physical Cell identity (PCI), which helps UEs in the system to identify and separate different NR Cells from each other. For example, FIG. 3 illustrates a network including two TRPs 20A, 20B that serve respective cells 22A, 22B. The TRPs each broadcast a unique SSB, namely, SSB1 and SSB2, in their respective cells. UEs in the RRC IDLE and RRC CONNECTIVE INACTIVE states are searching, synchronizing, measuring and resolving different NR Cells based on received SSB transmissions. The information obtained in such procedures is used to control cell selection/re-selection and camping on NR cells. When a UE needs to access the RAN system, it uses the Physical Random-Access Channel (PRACH) resources and configuration defined via the SSB for the NR Cell it is camping on and synchronized to.

To access a cell in the RAN, a UE typically engages in a Random Access signaling process involving four messages (MSG 1, MSG 2, MSG 3 and MSG 4), as shown in FIG. 4. MSG 1 is a preamble sent by the UE on a random access channel (RACH) associated with the cell, where RACH is the logical channel carried on the PRACH. The network responds with a random access response (MSG 2) that indicates reception of the preamble and indicates a time alignment command for adjusting the timing of transmissions by the UE. The UE then sends MSG 3, which requests setup of an RRC connection. The MSG 4 or a later DL message may contain RRC information regarding the connection configuration for the UE, when it is set up in the NR Cell where it made the access.

Handover between two cells can be divided into different time phases, such as network configuration of the UE, UE candidate search and evaluation, UE reporting to the network, target preparation, handover execution and handover completion. The network configuration, UE reporting and handover execution phases are typically performed using radio resource control (RRC) signalling. However, handover execution may also include a random-access attempt to the target cell to allow for time alignment adjustments of UE transmission time if needed.

In fourth generation (4G) systems, seamless handover and robust handover are achieved by letting two or more TRPs serve the same cell by transmitting identical and synchronized DL signals. A UE perceives such signals as originating from only one cell. This concept is called a "combined cell" for bi-directional transmission or Single Frequency Network (SFN) for downlink (DL) only transmissions. A drawback with using a combined cell or SFN, however, is that it may reduce the efficiency of the total available radio resources within the area covered by the combined cell or SFN.

Another important aspect of a mobile communication system is transmission selectivity. Being selective when transmitting, to avoid disturbing other ongoing transmissions and to enable resource re-use by not utilizing more resources than necessary so other users can use them, is a key property for achieving high capacity and optimal coverage in a cellular network with limited spectrum assets. To be selective, the network need to get support from the UE to identify the best TRP candidates to be used for DL transmissions to the UE's. The best TRP candidates to be used for reception can also be selected based on UE support.

The NR standard allows the SSB to be divided into several SSB beams, where each SSB beam can be identified by an SSB index. There is, however, a limitation for how many SSB indexes an SSB transmission can be divided into. The number depends on the orthogonal frequency-division multiple access (OFDMA) subcarriers spacing used for the transmission. For NR capable UE's, current UE support to detect and distinguish multiple TRP's using SSB index within the same cell is limited to 4 SSB indexes per SSB transmission when the subcarrier spacing (SCS) is 15 kHz. A maximum of 4 SSB indexes allows only up to 4 beams to be uniquely identified by UE.

SUMMARY

Some embodiments described herein provide a method of operating a network node. The method includes establishing a connection to a wireless device from a first transmission/reception point, TRP, that serves a multiple-TRP cell, and configuring the wireless device to generate measurement reports based on a TRP-specific reference signal transmitted by a second TRP that serves the multiple-TRP cell.

Configuring the wireless device to generate measurement reports based on the TRP-specific reference signal transmitted by the second TRP that serves the multiple-TRP cell may include configuring the wireless device to generate a measurement report in response to occurrence of an entering condition when a difference between a signal power of the TRP-specific reference signal and a signal power of a multiple-TRP reference signal associated with the multiple-TRP cell rises above a first threshold.

In some embodiments, configuring the wireless device to generate measurement reports based on the TRP-specific reference signal may include configuring the wireless device to generate a measurement report in response to occurrence of a leaving condition when the difference between the signal power of the TRP-specific reference signal and the signal power of the multiple-TRP reference signal associated with the multiple-TRP cell drops below a second threshold.

In some embodiments, each of the TRP-specific reference signal and the multiple-TRP reference signal may include a synchronization signal, and each of the signal power of the TRP-specific reference signal and the signal power of the multiple-TRP reference signal may include a synchronization signal received signal reference power, SS-RSRP In some embodiments, the multiple-TRP reference signal associated with the multiple-TRP cell includes a composite signal generated by a plurality of TRPs that serve the multiple-TRP cell.

In some embodiments, the first and second thresholds are based on a difference between a signal power of a second reference signal transmitted by the second TRP and a multiple-TRP reference signal transmitted by the first TRP in the multiple-TRP cell.

In some embodiments, the entering condition occurs when the difference between the signal power of the second reference signal and the signal power of the first reference signal rises above a first threshold.

In some embodiments, the leaving condition occurs when the difference between the signal power of the second reference signal and the signal power of the first reference signal falls below a second threshold.

In some embodiments, the first threshold and the second threshold may be different levels.

The method may further include receiving a measurement report from the wireless device, and initiating a multiple-TRP mobility procedure for the wireless device in response to the measurement report.

In some embodiments, initiating the multiple-TRP mobility procedure includes adding or removing a secondary sector carrier between the wireless device and the second TRP in response to the measurement report.

The method may further include maintaining a connection between the multiple-TRP cell and the wireless device until the occurrence of a layer 3 handover of the wireless device to a neighboring cell.

In some embodiments, the TRP-specific reference signal transmitted by the second TRP is associated with a TRP-specific cell served by the second TRP.

In some embodiments, configuring the wireless device to generate measurement reports based on the TRP-specific reference signal transmitted by the second TRP that serves the multiple-TRP cell includes configuring the wireless device with a list of physical cell identifiers, PCI, and/or synchronization signal blocks, SSB, associated with of cells for which generation of measurement reports should be triggered.

A network node according to some embodiments includes a processing circuitry, and a memory coupled to the processing circuitry. The memory includes computer readable instructions that when executed by the processing circuitry cause the processing circuitry to perform operations of establishing a connection to a wireless device from a first transmission/reception point, TRP, that serves a multiple-TRP cell, and configuring the wireless device to generate measurement reports based on a TRP-specific reference signal transmitted by a second TRP that serves the multiple-TRP cell.

A network node according to some embodiments is adapted to perform operations of establishing a connection to a wireless device from a first transmission/reception point, TRP, that serves a multiple-TRP cell, and configuring the wireless device to generate measurement reports based on a TRP-specific reference signal transmitted by a second TRP that serves the multiple-TRP cell.

Some embodiments provide a computer program product including a non-transitory storage medium including program code to be executed by processing circuitry of a network node, whereby execution of the program code causes the network node to perform operations of establishing a connection to a wireless device from a first transmission/reception point, TRP, that serves a multiple-TRP cell, and configuring the wireless device to generate measurement reports based on a TRP-specific reference signal transmitted by a second TRP that serves the multiple-TRP cell.

A method of operating a wireless device according to some embodiments includes establishing a connection to a first transmission/reception point, TRP, that serves a multiple-TRP cell, and generating a measurement report based on a TRP-specific reference signal transmitted by a second TRP that serves the multiple-TRP cell.

In some embodiments, the wireless device is configured to generate measurement reports based on a comparison of a signal power of the TRP-specific reference signal transmitted by the second TRP that serves the multiple-TRP cell and a signal power of a multiple-TRP reference signal associated with the multiple-TRP cell.

In some embodiments, the wireless device is configured to generate a measurement report in response to occurrence of an entering condition when a difference between the signal power of the TRP-specific reference signal and a signal power of the multiple-TRP reference signal rises above a first threshold, and in response to occurrence of a leaving condition when a difference between the signal power of the TRP-specific reference signal and the signal power of the multiple-TRP reference signal drops below a second threshold. In some embodiments, the first threshold and the second threshold are different levels.

The may further include transmitting a measurement report from the wireless device to the first TRP, and receiving a command from the TRP initiating a multiple-TRP mobility procedure for the wireless device in response to the measurement report.

In some embodiments, the multiple-TRP mobility procedure includes adding or removing a secondary sector carrier between the wireless device and the second TRP in response to the measurement report.

The method may further include maintaining a connection between the multiple-TRP cell and the wireless device until the occurrence of a layer 3 handover of the wireless device to a neighboring cell.

In some embodiments, the multiple-TRP reference signal associated with the multiple-TRP cell includes a composite signal generated by a plurality of TRPs that serve the multiple-TRP cell.

In some embodiments, the wireless device is configured to generate measurement reports based on the TRP-specific reference signal transmitted by the second TRP that serves the multiple-TRP cell based on a list of physical cell identifiers, PCI, and/or synchronization signal blocks, SSBS, associated with cells for which generation of measurement reports should be triggered.

A wireless device according to some embodiments includes a processing circuitry, and a memory coupled to the processing circuitry. The memory includes computer readable instructions that when executed by the processing circuitry cause the processing circuitry to perform operations of establishing a connection to a first transmission/reception point, TRP, that serves a multiple-TRP cell, and generating a measurement report based on a TRP-specific reference signal transmitted by a second TRP that serves the multiple-TRP cell.

A wireless device according to some embodiments is adapted to perform operations of establishing a connection to a first transmission/reception point, TRP, that serves a multiple-TRP cell, and generating a measurement report based on a TRP-specific reference signal transmitted by a second TRP that serves the multiple-TRP cell.

Some embodiments provide a computer program product including a non-transitory storage medium including program code to be executed by processing circuitry of a wireless device, whereby execution of the program code causes the network node to perform operations of establishing a connection to a first transmission/reception point, TRP, that serves a multiple-TRP cell, and generating a measurement report based on a TRP-specific reference signal transmitted by a second TRP that serves the multiple-TRP cell.

Some potential advantages of the systems/methods described herein are that enhanced reporting capabilities may be provided for UEs connected to multiple-TRP cells to support Layer 2 mobility within the multiple-TRP cell.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
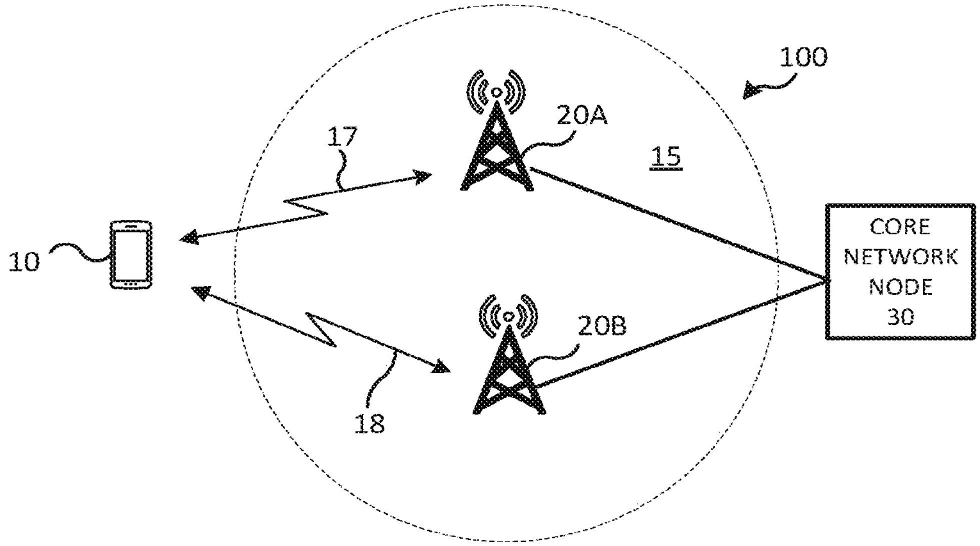
FIG. 1 Prior Art
FIG. 1 is a schematic illustration of a wireless communication system.
Figure 2:
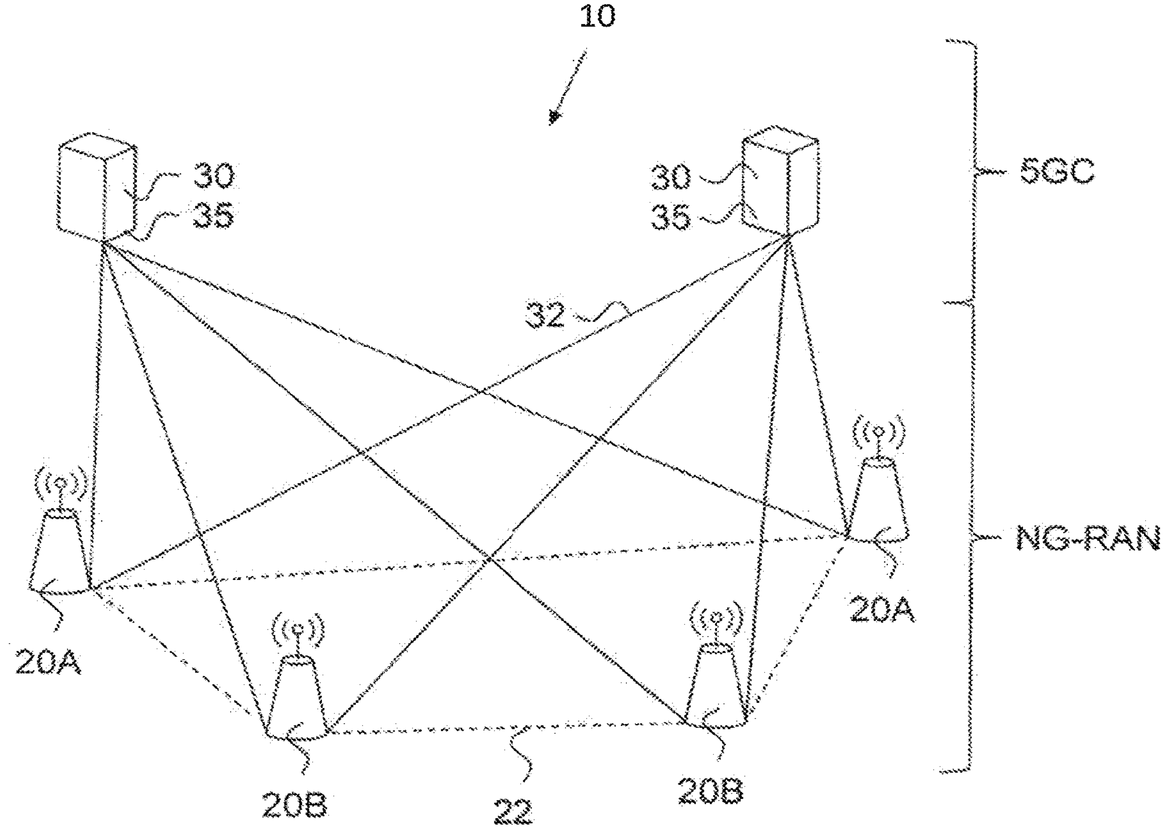
FIG. 2 Prior Art
FIG. 2 is a schematic illustration of a top-level overview of nodes and interfaces in a new generation cellular communication system.
Figure 3:
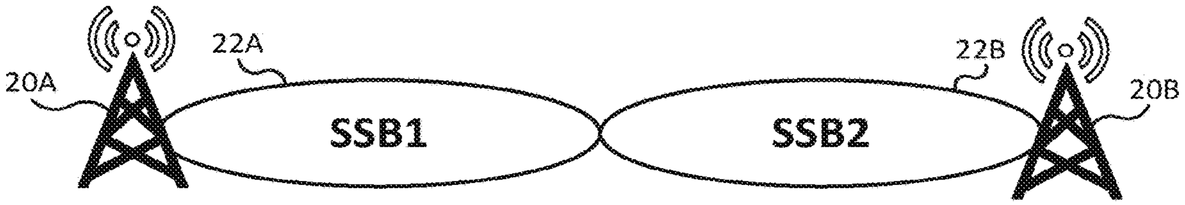
FIG. 3 Prior Art
FIG. 3 illustrates two transmit/receive points with associated cells.
Figure 4:
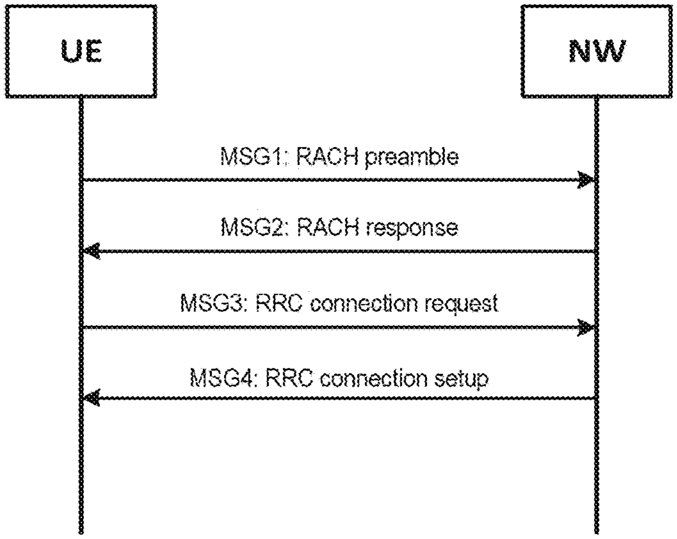
FIG. 4 Prior Art
FIG. 4 illustrates a random access procedure for accessing a cell.
Figure 5:
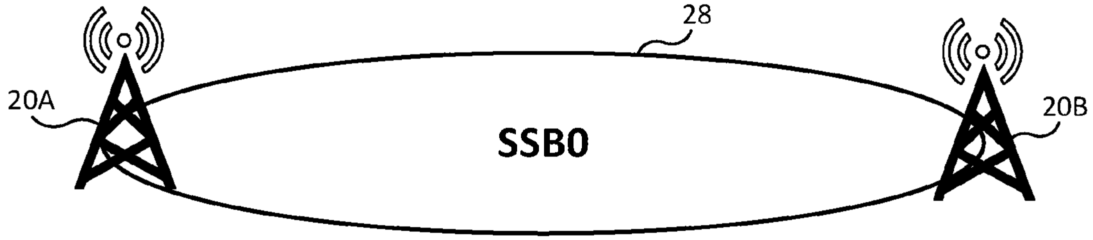
FIGS. 5-7 illustrate multiple-TRP cell configurations.

As noted above, the 3GPP NR specification supports multiple TRPs serving a single NR cell. For example, as shown in FIG. 5, both TRPs 20A, 20B transmit SSB0 that defines a single multiple-TRP cell 28. The use of multiple-TRP cells can be beneficial from an operator management point of view when the number of TRPs increase in the network. The use of multiple-TRP cells can also provide certain performance enhancements, such as transmission diversity, DU-MIMO, improved mobility (seamless Layer 2 mobility), etc. If each TRP defines a unique NR cell, then each TRP must have its own PRACH resources. However, if multiple TRPs represent a common cell, those TRPs need to share a single PRACH resource. This may limit the uplink access capacity for a multiple-TRP NR Cell.

Figure 6:
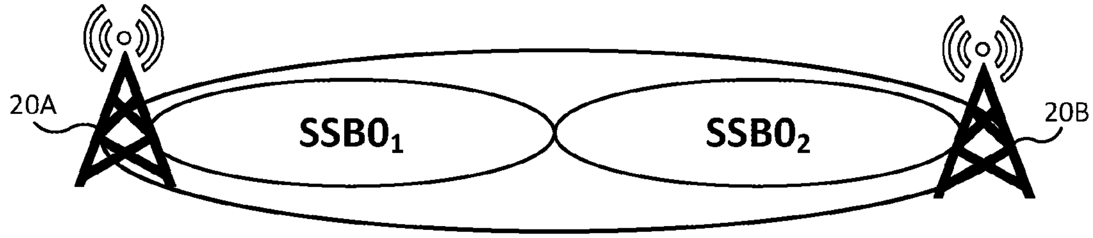

To address this problem, the 3GPP specification supports SSB indexing, that is, the use of SSBs with the same PCI but with an index difference. This scenario is shown in FIG. 6, in which TRP 20A transmits SSB01 (or SSB0 with index 1) and TRP 20A transmits SSB02 (or SSB0 with index 2). Since these SSBs share the same PCI, a UE knows that these SSBs represent the same NR Cell. One benefit of this approach is that each SSB_index can point to its own unique PRACH resource in the same way as if it is different NR Cells. Thereby, the PRACH capacity problem is addressed for multiple-TRP NR Cells.

Figure 7:
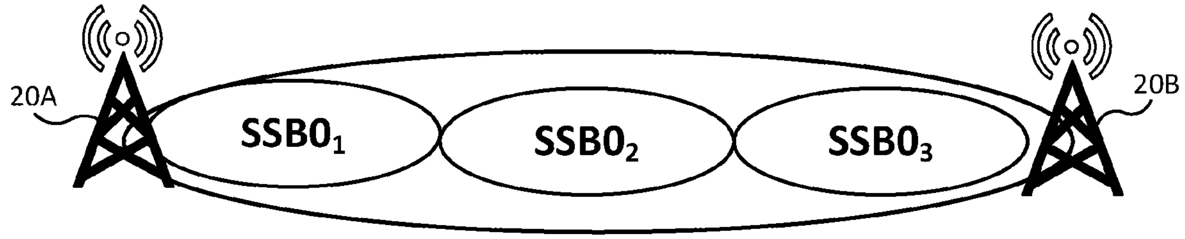

However, one problem with the SSB index approach is that it is only possible to have a limited number of SSB_indexes per PCI (NR Cell). If a multiple-TRP NR Cell should contain more TRPs than the number of possible SSB_indexes it is not possible to achieve the same PRACH capacity as it if each TRP were associated with a unique NR Cell, unless a re-use and SSB_index planning is applied such as shown in FIG. 7, which complicates the operator deployment efforts.

In some embodiments, a TRP transmits multiple SSBs concurrently in a same sector carrier. Systems/methods for concurrently transmitting multiple SSBs will now be described with reference to FIG. 8 and FIGS. 9A-9D, 10A-B and 11.

In NR, the physical cell identity (PCI) is communicated to the UE via a primary synchronization signal (PSS) and a secondary synchronization signal (SSS). The PSS can assume the values 0, 1, 2 and the SSS can independently assume the values 0, . . . , 335. In other words, by combining the PSS and the SSS values it is possible for a UE to identify one out of 1008 unique SSBs/PCIs. Accordingly, the network may use the SSB frequency and the PCI to identify different Cells/TRPs.

Furthermore, by transmission of more than one SSB from a TRP, more than one cell associated with the TRP can be identified. These cells can be configured independently of each other. This means that by transmitting two different SSBs, a single TRP can be associated with a cell that is unique for the TRP in question, and at the same time be associated with a combined cell, common for the TRP in question and one or more neighboring cells.

Figure 8:
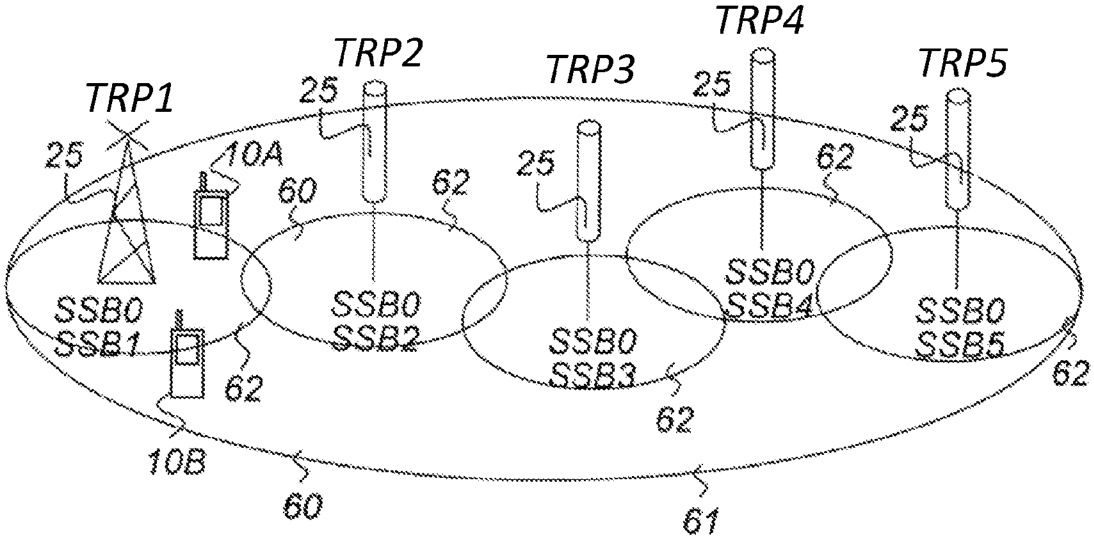
FIG. 8 is a schematic illustration of an embodiment of co-existing single-TRP cells and multiple-TRPX cells.

An example of a cell configuration is illustrated schematically in FIG. 8. Five TRPs 25 are present within an area. Each TRP 25 transmits a unique SSB, SSB1-SSB5, which defines a cell 62 that is associated with a single TRP 25 In this example, all TRPs 25 in the area can transmit an additional SSB, SSB0, thereby defining a multiple TRP cell 61 (or an SFN cell). In the area, the UEs 10A, 10B experiences that there are six cells 60; five single TRP cells 62 and one combined (multiple-TRP) cell 61. Preferably, the network has configured SSB0 for a cell configured to be indicated as not available for idle or inactive mode camping to the UE's. In such an embodiment, the wireless device 10A, 10B will do cell reselection in idle/inactive mode only between SSB1-SSB5.

Paging reception and initial Random Access attempts will typically also only be done using Cells 62 represented by SSB1-SSB5. Once the UE and the network have setup an RRC connection, the network may or may not reconfigure the UE. Consider the first wireless device 10A in FIG. 8. The wireless device 10A detects signals comprising SSB0, SSB1 and weaker signals comprising SSB2. Since the SSB0 is configured not to be used for random access, an RRC connection is established with TRP1 based on the SSB1. The wireless device 10A is more or less stationary but requires Mobile Broadband communication. The network thereby chooses to let the wireless device 10A stay in the single TRP cell 62 associated with TRP1.

Another wireless device 10B is also connected to the TRP1 based on the SSB1. The wireless device 10B only requires voice communication, i.e. the required band width is rather limited. However, the wireless device 10B is expected to move and requires a continuous connection without any interruptions. The network may therefore select to handover the wireless device 10B to the combined cell 61 defined by the SSB0. This reduces the risks for disconnections during any repeated mobility related handover procedures.

From these examples, a method for cell assignment can be expressed. The method comprises selection of a cell intended for a UE out of at least a first cell and a second cell. The first cell is unique for a first TRP. The second cell is a combined cell of the first TRP and at least one neighboring, second TRP. The method further comprises assignment of the selected cell to the UE.

The combined cell may be defined in that at least two TRPs transmit identical SSBs at a same time and frequency so that a UE perceives it to represent the same SSB. In some embodiments, the selection of a cell is performed dependent on needs and capabilities of the UE. The first cell may be selected if the UE requires Mobile Broadband communication. The first cell may be selected if the UE requires communication of non-real-time video or image data. The second cell may be selected if communication with the UE is reliability sensitive. The second cell may be selected if the UE requires voice communication, real-time video communication, interactive gaming communication or communication of latency-sensitive control communication.

With the multi TRP SSB deployment it is thus possible to configure the connections individually per UE, adapted to respective needs and capabilities, in the same area. A UE can be configured to the single SSB per TRP where handover between TRP's then are performed. A UE can be configured to the combined cell type of SSB where multiple TRPs are a single cell. Thereby the robust and RRC signalling free and seamless handover between TRPs can be achieved for this UE, at the expense of capacity i.e. as in a legacy SFN combined cell.

These possibilities are thus based on the provision of more than one SSB from a single TRP. In some embodiments, first SSBs are transmitted at a sector carrier. The transmission is performed from a first TRP of a cellular telecommunication system. The first SSBs define a first cell. This cell is unique for the first TRP. Second SSBs are also transmitted at the sector carrier. The transmission is performed from the same first TRP. The second SSBs define a second cell. The second cell is a combined cell of the first TRP and at least one neighboring, second TRP.

The combined cell may be defined in that at least two TRPs transmit identical SSBs at a same time and frequency so that a UE perceives it to represent a same SSB.

As mentioned briefly above, the SSB may include, and thereby be identified by, a PCI. In other words, the first SSBs comprise a PCI of the first cell and the second SSBs comprise a PCI of the second cell. SSBs defining the second cell transmitted from different TRPs include the same PCI of the second cell.

In some embodiments, the PCI comprises a PSS and an SSS. This allows a UE to support the TRP selection by blind detection and measurements of many unique SSBs. For NR, 1008 SSBs are available.

The first SSBs and second SSBs may be transmitted concurrently and/or interleaved in time. In a case where two different SSBs are to be transmitted from a TRP, there are four main alternatives of arrangements. The different types of SSB transmission from multiple TRP's are to allow one transmission to be perceived as e.g. SFN combined and the other to be perceived as unique per TRP.

Figure 9A:
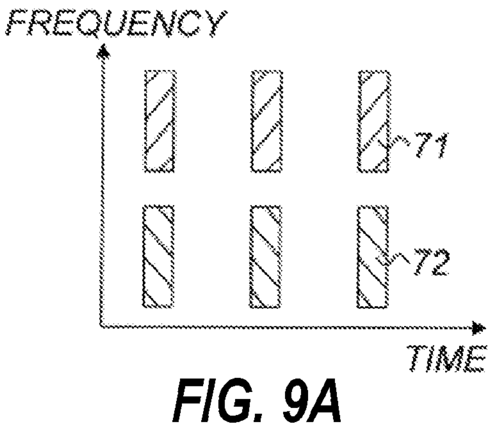
FIGS. 9A-D illustrate examples of distribution of SSBs in a frequency/time space.

FIG. 9A illustrates schematically an embodiment where the SSB transmissions are separated in frequency. A first SSB 71 is transmitted in one subcarrier and a second SSB 72 is transmitted in another non-overlapping sub carrier. The two types of SSB transmissions are in this embodiment transmitted at the same time. A UE will thus perceive this situation as Inter frequency cells. In other words, in one embodiment, first SSBs are provided at a different frequency compared to second SSBs.

Figure 9B:
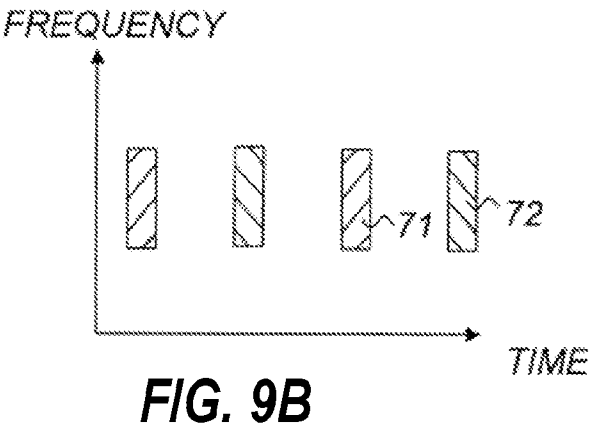

FIG. 9B illustrates schematically an embodiment in which the SSB transmissions are separated in time. The first SSB 71 and the second SSB 72 use overlapping sub carriers but transmit the two types of SSB transmissions at different non-overlapping times. A UE will perceive this as Intra frequency non time aligned cells. In other words, in one embodiment, first SSBs are provided at a different time slot compared to second SSBs.

Figure 9C:
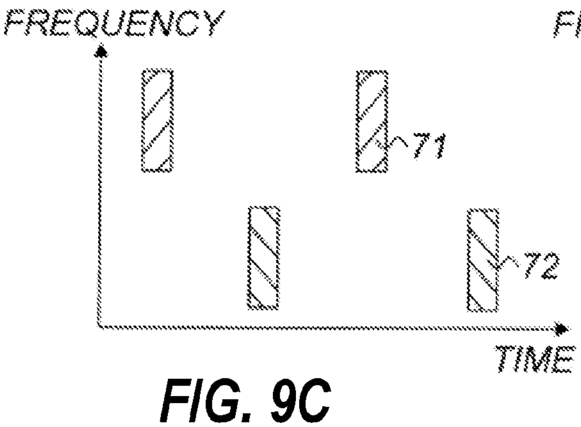

FIG. 9C illustrates schematically yet another embodiment, in which the SSB transmissions are separated in both time and frequency. The first SSB 71 and the second SSB 72 use non-overlapping sub carriers for the transmission and transmit the two types of SSB transmissions at different non-overlapping times. A UE will perceive this as Inter frequency non time aligned cells. In other words, in one embodiment, first SSBs are provided at a different time slot as well as a different frequency compared to second SSBs.

Figure 9D:
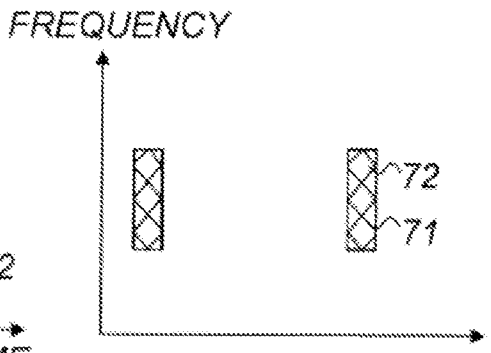

FIG. 9D illustrates schematically yet another embodiment, where both SSB transmissions 71, 72 from one TRP are superimposed on top of each other. The first SSB 71 and the second SSB 72 thus use exactly the same resource elements (RE). Preferably, if PSS/SSS is used for identification, the same RE is used for the PSS/SSS transmission comprising a same PSS signal but with differing SSS signals. A UE will perceive this as Intra frequency Cells. In this case the SSB transmission may need to be boosted 3 dB to allow SSB power levels to be on par with other transmission from the TRP. In other words, in one embodiment, at least one of the first SSBs and at least one of the second SSBs are superimposed on top of each other, using a same resource element.

In some embodiments, the periodicity of the SSB transmissions may also be altered. For example, in one embodiment, a time between two consecutive first SSBs is the same a time between two consecutive second SSBs. However, in alternative embodiments, the periodicity for the two types of SSB transmissions may differ.

Figure 10A:
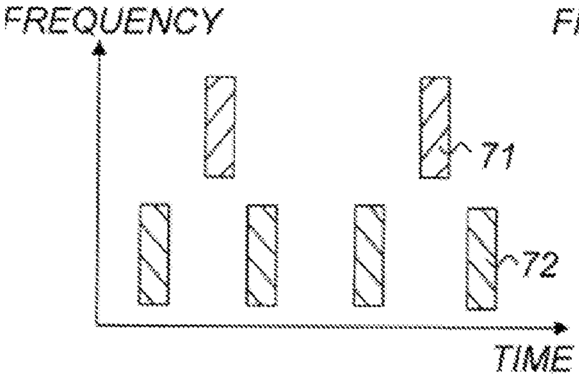
FIGS. 10A-B illustrate examples of distribution of SSBs with differing periodicity.
Figure 10B:
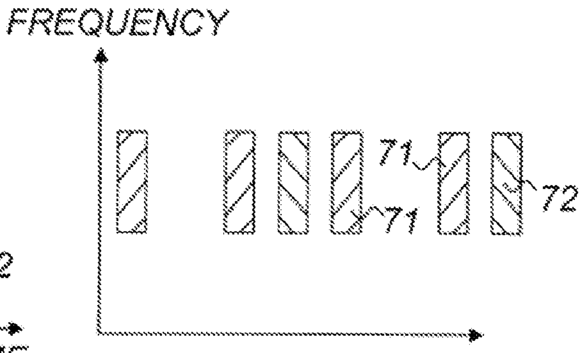

FIG. 10A illustrates schematically an embodiment in which the SSBs 71 and 72 use different sub carriers and furthermore present different periodicity. FIG. 10B illustrates schematically an embodiment in which the SSBs 71 and 72 use the same sub carrier but use different periodicity. From these examples, a person skilled in the art realizes that there are further possible variations. The periodicity difference may also be much larger than illustrated. For instance, one SSB may be transmitted with a 15 ms periodicity and the other with a 160 ms periodicity, as currently allowed by the NR standard. In other words, in one embodiment, a time between two consecutive first SSBs is different from a time between two consecutive second SSBs.

Figure 11:
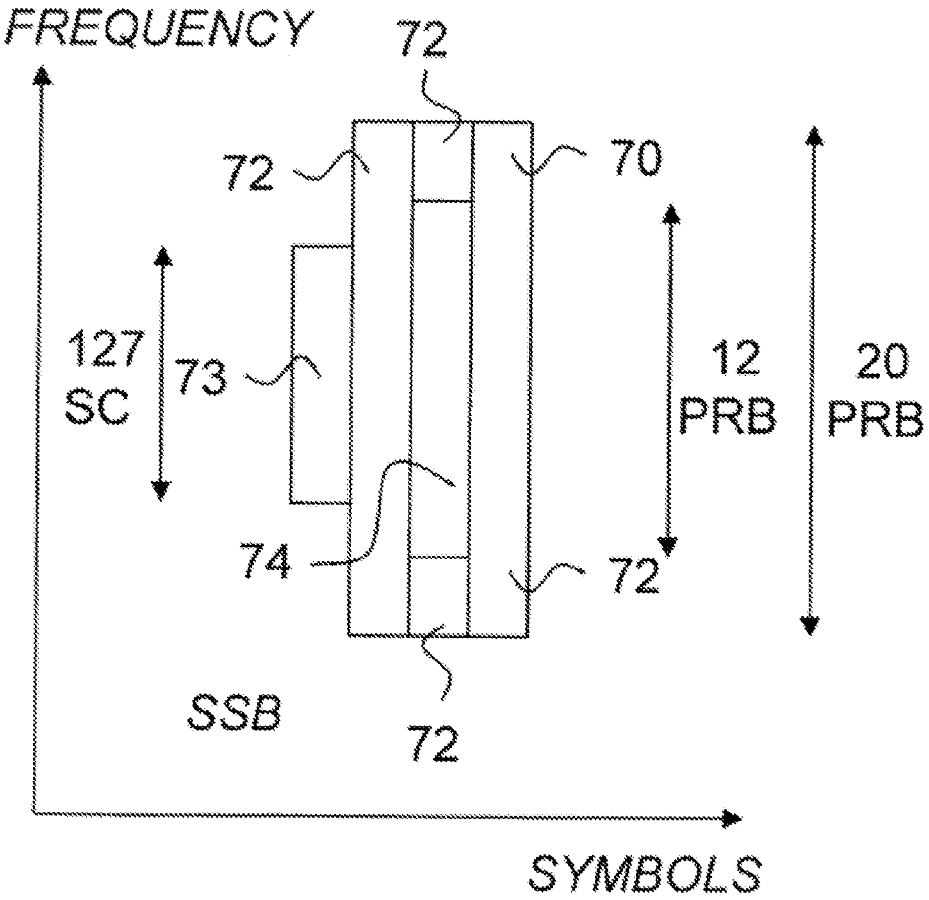
FIG. 11 is a schematic illustration of an embodiment of an SSB.

FIG. 11 illustrates an example of a structure of an SSB 70. The SSB 79 includes the PSS 73 and the SSS 74. The PSS 73 and an SSS 74 are interleaved with Physical Broadcast Channel (PBCH) signalling 72 that carries a Master Information Block (MIB). The presence of the PSS/SSS 73, 74 enables the UE to easily search and blank detect the cell, and the PBCH provides the UE with information needed to perform an initial access of the cell. The PSS 73 corresponds to 127 subcarriers and the SSS 74 occupies 12 Physical Resource Blocks (PRB), while the entire SSB 70 utilizes 20 PRB.

A UE may perform matched filtering of the PBCH to find the PSS 73. The UE may then detect the SSS in frequency domain. The PSS and SSS together indicate the physical cell ID (PCI). The UE decodes the Master Information Block (MIB) contained in the PBCH. The MIB carries some of the information needed to access the cell, such as system frame number (SFN), subcarrier spacing (SCS), the location of SIB1 resources on the physical downlink shared channel (PDSCH), etc. The remaining minimum system information (RMSI) is carried on the PDSCH in SIB1. After the UE has read RMSI from SIB1, it can perform a random access procedure to the cell associated with the PCI.

Figure 12:
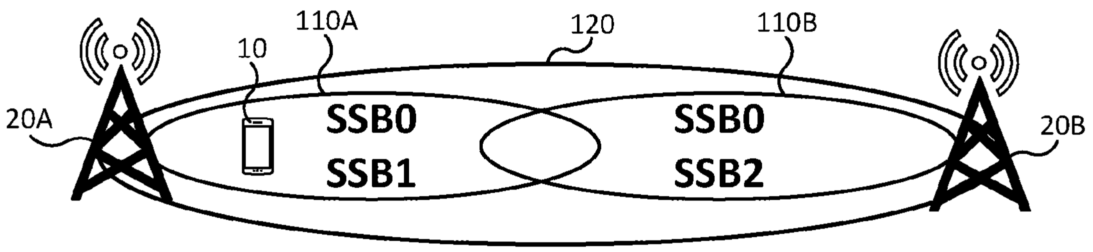
FIG. 12 illustrates a multiple-TRP cell served by TRPs that broadcast multiple SSBs according to some embodiments.

As discussed above, in a multiple-TRP NR cell, each TRP in the cell transmits the same SSB, which represents a single NR cell to the UEs in the system. According to some embodiments, each TRP can also transmit one or more additional TRP-specific SSBs, each of which identifies an additional cell to the UE. Accordingly, as shown in FIG. 12, in some embodiments, each TRP 10A, 20B may broadcast two SSBs associated with two cells on the same sector carrier. For example, a first TRP 20A may broadcast a TRP-specific SSB (SSB1) and also a multiple-TRP SSB (SSB0). Likewise, a second TRP 20B may broadcast a TRP-specific SSB (SSB2) and also the multiple-TRP SSB (SSB0). The TRP-specific SSB1 is associated with a single-TRP cell 110A served by TRP 20A, while the TRP-specific SSB2 is associated with a single-TRP cell 110B served by TRP 20B. The multiple-TRP SSB (SSB0) is associated with a multiple-TRP cell 120.

To a UE, these SSBs identify different NR cells. That is, a UE would have no knowledge about any of their relation to the TRPs. A UE may identify each TRP using frequency, SSB, SSB index or TRP-specific Reference Symbol (RS) transmissions.

In 3GPP, the conventional mobility support when using a single TRP per cell is to configure a UE to search, identify, evaluate and report SSBs. If a multiple-TRP cell is deployed, then all TRPs transmit the same SSB for the in a synchronized way so that the SSB appears to the UE to be coming from a single cell.

Although a UE may continually monitor SSBs of serving and neighbor cells, the UE may be configured to generate and send measurements only under certain conditions, such as when a predefined measurement event (or triggering event) occurs. This allows the UE to send measurement reports only upon the occurrence of specific conditions that may be likely to result in some action being taken by the network, such as a handover. Restricting the generation and transmission of measurement reports may significantly reduce the signaling burden on the UE and network, especially if the cells are large and the UE mobility is low.

The event types typically used for supporting mobility from 3GPP framework are:

Event A3: The signal power of a reference signal broadcast by a neighbor cell becomes better by a predetermined offset than the signal power of a corresponding reference signal broadcast by a Special Cell (SpCell) that serves the UE.

Event A4: The signal power of a reference signal broadcast by a neighbor cell becomes better than a predetermined threshold.

Event A5: The signal power of a reference signal broadcast by a SpCell that serves the UE becomes worse than a first threshold (threshold1) and the signal power of a reference signal broadcast by a neighbor cell becomes better than a second threshold (threshold2).

Event A6: The signal power of a reference signal broadcast by a neighbor cell becomes better by a predetermined threshold than the signal power of a corresponding reference signal broadcast by a Secondary Cell (SCell) that serves the UE.

There is typically only one instance per event type per frequency layer.

A Special Cell can, for example, be a PCell or a PSCell for carrier aggregation.

The 3GPP standard allows SSB, SSB index and reference signal (RS) to be reported periodically using MAC signaling. Furthermore, in the 3GPP frame work for NR, there is no support for similar events as in 3G to support concepts such as reporting range and active set and non-active set, such as:

Event 1a: A Primary CPICH enters the Reporting Range (FDD only).

Event 1b: A Primary CPICH leaves the Reporting Range (FDD only).

Event 1c: A Non-active Primary CPICH becomes better than an active Primary CPICH (FDD only).

Event 1d: Change of best cell (FDD only).

The current NR and LTE specifications do not allow the network to receive UE reports when a UE receives SSBs within a certain range of power levels from the best SSB received, which is conceptually possible with 3G event criteria. One solution is to use periodic reporting of all SSBs or SSB indexes measured by the UE. However, this would carry a large resource cost both for the UE and the network for transmitting and receiving UE measurement reports, and the vast majority of such reports would simply be discarded.

Some embodiments described herein provide additional reporting events in parallel on the same frequency layer to support multiple-TRP SpCell mobility. In particular, some embodiments provide one A3 instance (referred to herein as A3 instance 1) that uses only an entering condition to report when a signal power of a reference signal broadcast by a neighbor cell becomes better by a predetermined offset than the signal power of a corresponding reference signal broadcast by a SpCell that serves the UE. The predetermined offset may be configured by the network. Some embodiments further provide another instance of A3 (A3 instance 2) that uses both entering and leaving conditions for reporting, including triggering events that occur when the signal power of a reference signal broadcast by a neighbor cell enters or leaves a range within x dB (where x is a range of power levels) from a power level of a reference signal broadcast by the SpCell. By using two A3 instances as described herein, similar reporting behavior as provided for reporting range in 3G can be achieved. AS noted above event A3 supports SpCell (PCell or PSCell) mobility. A similar solution may be provided for multiple-TRP SCell mobility using two instances of event A6.

Some embodiments further use the 3GPP concept of a "white list" for reducing UE event reports to only be for SSBs of interest. That is, a UE may be configured to only report occurrences of the events described herein for TRPs that are on a "white list" configured by the network. The white list may include only those TRPs that serve a multiple-TRP cell to which the UE is RRC connected. For example, referring again to FIG. 12, the wireless device 10 connected to cell 120 may be configured with a white list including TRPs 20A and 20B.

Figure 13:
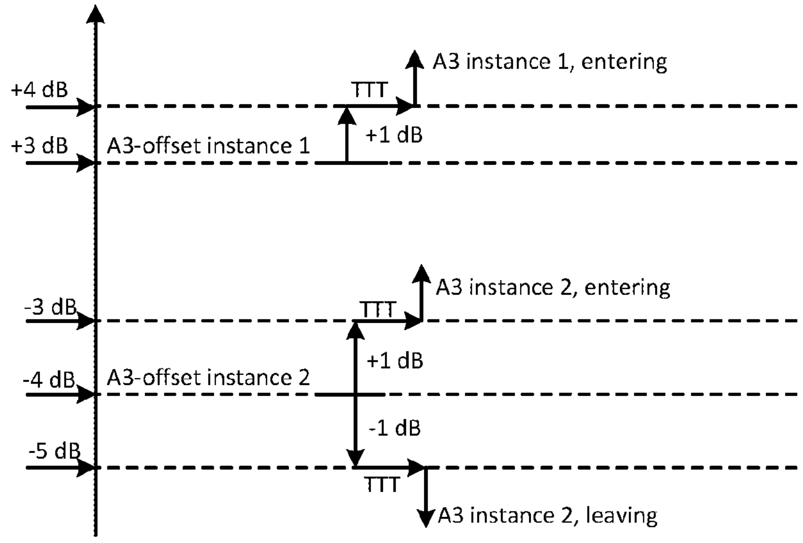
FIG. 13 illustrates measurement report triggering events according to some embodiments.

FIG. 13 illustrates event report triggering according to some embodiments. In FIG. 13, the y-axis represents detected reference signal power level differences, while the x-axis represents time. Two scenarios are illustrated in FIG. 13: conventional A3/A6 event triggering in the upper part of FIG. 13 (A3/A6 instance 1) and A3/A6 event triggering according to embodiments of the inventive concepts in the lower part of FIG. 13 (A3/A6 instance 2). As discussed above, in a conventional system, an A3/A6 event is triggered when the signal power of a reference signal broadcast by a neighbor cell becomes better by a predetermined offset than the signal power of a corresponding reference signal broadcast by a Special Cell (SpCell) or SCell that serves the UE.

Accordingly, referring to the upper portion of FIG. 13, when a difference between a reference signal broadcast by a neighbor cell and a corresponding reference signal broadcast by a serving cell becomes greater than a threshold of 3 dB (plus a 1 dB offset) and remains greater than the threshold for the duration of a time-to-trigger (TTT) period, an A3/A6 reporting event is triggered (A3/A6 instance 1).

Referring to the lower portion of FIG. 13, some embodiments provide additional A3/A6 reporting events (A3/A6 instance 2) including an entering event that is triggered when the signal power of the reference signal broadcast by a neighbor cell (e.g., a whitelisted neighbor cell) comes within a first threshold difference of the signal power of the reference signal broadcast by the serving SpCell/SCell. In the example shown in FIG. 13, the first threshold difference is −4 dB, plus an offset of +1 dB. Thus, when a signal power of a reference signal broadcast by a neighbor cell comes within a threshold of −3 dB of the signal power of a corresponding reference signal broadcast by a serving cell and the difference remains greater than −3 dB for the duration of a time-to-trigger (TTT) period, an A3/A6 (instance 2, entering) reporting event is triggered.

Similarly, some embodiments provide an additional leaving event that is triggered when the signal power of the reference signal broadcast by a neighbor cell (e.g., a whitelisted neighbor cell) falls below a signal power of the reference signal broadcast by the serving SpCell/SCell by more than a second threshold. In the example shown in FIG. 13, the second threshold difference is −4 dB, plus an offset of −1 dB. Thus, when a signal power of a reference signal broadcast by a neighbor falls below a second threshold of −5 dB below the signal power of a corresponding reference signal broadcast by a serving cell and remains lower than the second threshold for the duration of a time-to-trigger (TTT) period, an A3/A6 (instance 2, leaving) reporting event is triggered.

Embodiments described herein may provide certain advantages. For example, some embodiments provide enhanced reporting capabilities for UEs connected to multiple-TRP cells to support Layer 2 mobility within the multiple-TRP cell.

As noted above, each TRP in a multiple-TRP cell transmits the same SSB and therefore represents a single cell from the perspective of the UEs in the system. Additionally, a TRP can also transmit an additional SSB which identifies an additional cell for the UE. Accordingly, a TRP may broadcast SSBs associated with two cells on the same sector carrier. For the UEs, these SSBs identify different cells. However the UE has no knowledge about any of their relation to TRPs.

According to some embodiments, a network may set up and keep a UE connected to a SpCell associated with a first SSB, such as SSB0 in the example shown in FIG. 12, until a Layer 3 (L3) handover to another SpCell is needed. Within the SpCell 120, TRP-specific cells 110A, 110B associated with TRP-specific SSBs (SSB1, SSB2) are campable and accessible by the wireless device 10. That is, the TRP-specific cells 110A, 110B are cells that a wireless device 10 may consider for cell reselection and random access, and that the network may consider for multiple-TRP use. Network planning may ensure that TRP-specific SSBs are unique within an area larger than the multiple-TRP cell.

In this example, the wireless device 10 is RRC connected to the multiple-TRP SpCell 120 using SSB0. The network may configure the wireless device 10 for event A3 instance 2 reporting using received signal reference power (RSRP) of a synchronization signal (SS). It will be appreciated that other reference signal power measurements, such as channel state information reference signal power (CSI-RSRP) could be used. Other measurements, such as signal to interference plus noise ratio (SINR) could also be used.

In addition, the network may configure the wireless device 10 with a whitelist including SSB1 and SSB2 for event A3/A6 instance 2. Then, an event report will be triggered at wireless device 10 when the SS-RSRP signal level of SSB1 or SSB2 becomes interesting relative to the SS-RSRP of SSB0 (that is, when the difference between the level of SS-RSRP of SSB1 or SSB2 comes within or drops below a predetermined threshold of the level of SS-RSRP of SSB0).

Meanwhile, conventional A3/A6, instance 1 events may still be triggered. For example, A3/A6 instance 1 may be triggered when the SS-RSRP of a neighboring SSB (SSB1 or SSB2) becomes 3 dB stronger than the SS-RSRP of the serving SSB0. Initially, because the UE is connected to the multiple-TRP SpCell 120 using SSB0 through TRP 20A, the RSRP of SSB0 and SSB1 will be the same.

An A3 instance 2 report may be triggered when the wireless device 10 enters a coverage area of TRP 20B, for example, when the SS-RSRP of SSB2 becomes −3 dB or closer to the SS-RSRP of SSB0 (i.e., $RSRP_{SSB2}-RSRP_{SSB0}>=-3$, where $RSRP_{SSB0}$ is the received power level of SS-RSRP of SSB0, and $RSRP_{SSB2}$ is the received power level of SS-RSRP of SSB2).

An A3/A6 instance 2 report may also be triggered when the wireless device 10 leaves a coverage area of a TRP, for example, when the SS-RSRP of SSB2 becomes −5 dB or lower than the SS-RSRP of SSB0 (i.e., $RSRP_{SSB2}-RSRP_{SSB0}<=-5$).

Upon receipt of an A3/A6, instance 2 measurement report, the network may take one or more actions, such as considering to start using a TRP for a UE when an A3/A6 instance 2 entering condition is met (the RSRP of the neighboring SSB rises above the upper threshold of −3 dB), or considering stopping using TRP when an A3/A6 instance 2 leaving condition is met (the RSRP of the neighboring SSB falls below the lower threshold of −5 dB.

In one example, a network may configure a UE to use two intra-frequency A3 SS-RSRP event instances to support L3 mobility and MTRP mobility, where the following configuration parameters are used:

A3 instance 1: A3 offset=+3 dB, Hysteresis=1 dB, TTT=40-160 ms (Legacy L3 mobility), report amount=infinity.

A3 instance 2: A3 offset=−4 dB, Hysteresis=1 dB, report on leave=true, TTT=0-80 ms (MTRP), report amount=1 or more if needed.

Trigger quantity=SS-RSRP.

Measurement object filter coefficient for SS-RSRP=4.

The 3GPP standard (3GPP TS 38.331 v. 15.9.0) allows filter coefficient per measurement quantity but only one per measurement object (same SSBFrequency and SSBSCS=Intra frequency).

The 3GPP standard further allows black/white-listing of PCIS per measurement object, but not per event in the manner described herein. The use of white listing can however be activated per event (e.g., using the "reportconfigNR" information element). Some embodiments may use whitelisting to only trigger A3 instance 2 events from designated SSB cells, such as SSB cells that broadcast the SSB of the multiple-TRP cell to which a UE is connected.

Figure 14:
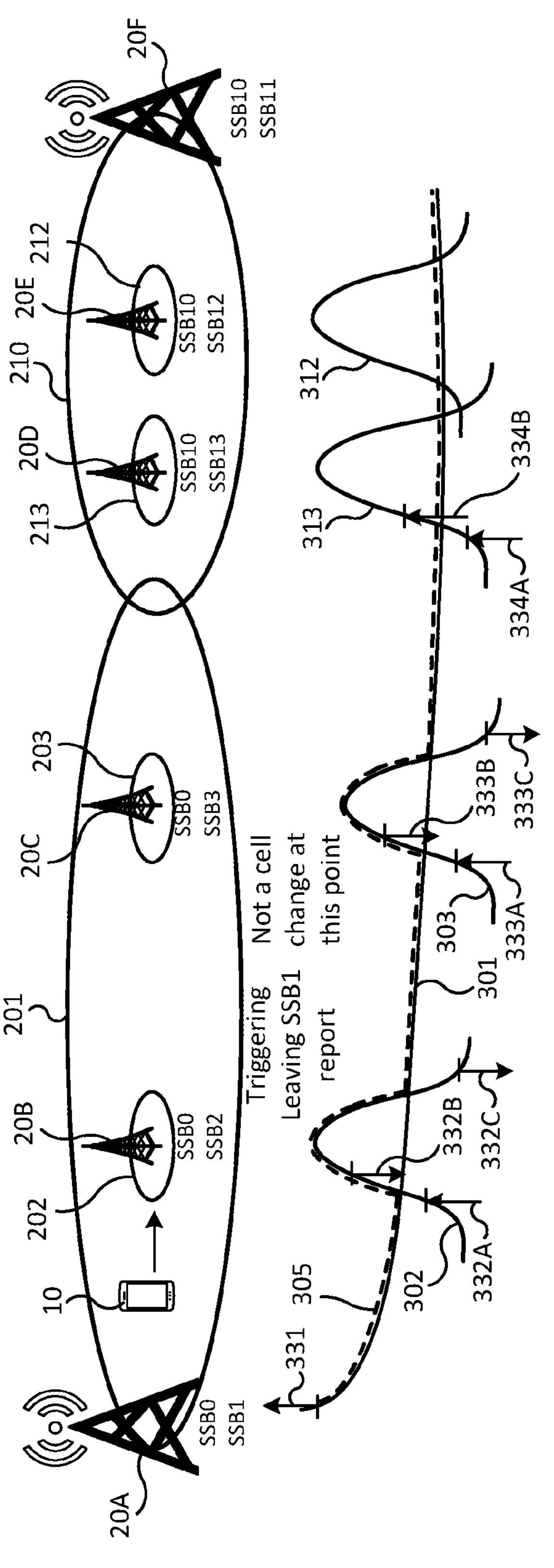
FIG. 14 illustrates measurement report triggering in a multiple-TRP cell served by TRPs that broadcast multiple SSBs according to some embodiments.

A further example is illustrated in FIG. 14, which shows a wireless device 10 moving through a coverage area including first and second multiple-TRP cells 201, 210. The first multiple-TRP cell 201 is associated with SSB0 and is served by TRPs 20A, 20B and 20C, all of which broadcast SSB0 along with a TRP-specific SSB. For example, TRP 20A broadcasts SSB1 along with SSB0. TRP 20B broadcasts SSB2 (cell 202) along with SSB0, and TRP 20C broadcasts SSB3 (cell 203) along with SSB0. The second multiple-TRP cell 210 is associated with SSB10 and is served by TRPs 20D, 20E and 20F, all of which broadcast SSB10 along with a TRP-specific SSB. For example, TRP 20D broadcasts SSB13 (cell 213) along with SSB10. TRP 20E broadcasts SSB12 (cell 212) along with SSB10, and TRP 20F broadcasts SSB11 along with SSB10.

Also shown in the figure is a graph of SS-RSRP signal power measured by the wireless device 10 as it moves through the coverage area, assuming that the wireless device 10 is initially connected to multiple-TRP cell 201 through TRP 20A (i.e., the UE is RRC connected to SSB0). As the wireless device 10 moves through the coverage area represented by cells 201, 210, the UE may continually measure the received power (e.g., the SS-RSRP) of signals broadcast by different TRPs.

In particular, curve 301 represents the signal power of SSB1/SSB0 broadcast by TRP 20A as measured by the wireless device 10 as it moves from left to right through the coverage area. Curve 302 represents the received signal power of SSB2/SSB0 broadcast by TRP 20B as measured by the wireless device 10, and curve 303 represents the received signal power of SSB3/SSB0 broadcast by TRP 20C as measured by the wireless device 10. Likewise, curve 313 represents the received signal power of SSB10/SSB13 broadcast by TRP 20D as measured by the wireless device 10, and curve 312 represents the received signal power of SSB10/SSB12 broadcast by TRP 20E as measured by the wireless device 10. Curve 305, represented by a dashed line, represents the received signal power of the composite SSB0 broadcast by all TRPs serving the multiple-TRP cell 201. Because the TRPs 20B and 20C also broadcast SSB0, the signal power of SSB0 received by the wireless device 10 increases in the neighborhood of those TRPs. For simplicity, the terms "received signal power," "signal power" and "RSRP" are used interchangeably herein.

As the wireless device 10 measures RSRP, such as SS-RSRP or CSI-RSRP, of the signals broadcast by the TRPs, the wireless device 10 compares the RSRP of its serving cell with the RSRP of the non-serving cells. As discussed above, a measurement reporting event may be triggered based on the comparison.

In an example, the wireless device 10 is initially RRC connected to SSB1, but is handed over to SSB0. At that point, the RSRP measured by the wireless device 10 for SSB0 and SSB1 are the same ($RSRP_{SSB0}=RSRP_{SSB1}$), since both are transmitted by TRP 20A on the same frequency and the UE is close to TRP 20A. As the wireless device 10 moves through the coverage area, the following events shown in FIG. 14 will be triggered:

Event 331: If the report amount is set to 2 after handover to SSB0, an A3 instance 2 triggering event will be reported by the wireless device 10, since the entering condition is fulfilled ($RSRP_{SSB1}-RSRP_{SSB0}=0>-3$ dB).

Event 332A: An A3 instance 2 event is triggered for SSB2. The entering condition for SSB2 is met since $RSRP_{SSB2}-RSRP_{SSB0}>-3$ dB.

Event 332B: An A3 instance 2 event is triggered for SSB1. The leaving condition for SSB1 is met since $RSRP_{SSB1}-RSRP_{SSB0}<-5$ dB.

Event 332C: An A3 instance 2 event is triggered for SSB2. The leaving condition for SSB2 is met since $RSRP_{SSB2}-RSRP_{SSB0}<-5$ dB.

Event 333A: An A3 instance 2 event is triggered for SSB3. The entering condition for SSB3 is met since $RSRP_{SSB3}-RSRP_{SSB0}>-3$ dB.

Event 333B: An A3 instance 2 event is triggered for SSB1. The leaving condition for SSB1 is met since $RSRP_{SSB1}-RSRP_{SSB0}<-5$ dB.

Event 333C: An A3 instance 2 event is triggered for SSB3. The leaving condition for SSB3 is met since $RSRP_{SSB3}-RSRP_{SSB0}<-5$ dB.

Event 334A: An A3 instance 2 event is triggered for SSB13. The entering condition for SSB13 is met since $RSRP_{SSB13}-RSRP_{SSB0}>-3$ dB.

Event 334B: An A3 instance 1 event is triggered for SSB13 and/or SSB10. The triggering condition for SSB13/SSB10 is met since $RSRP_{SSB13}-RSRP_{SSB0}>3$ dB and $RSRP_{SSB10}-RSRP_{SSB0}>3$ dB. In response to the A3 instance 1 event, the network may decide to initiate a handover of wireless device 10 via L3 handover to cell 210.

Figure 15:
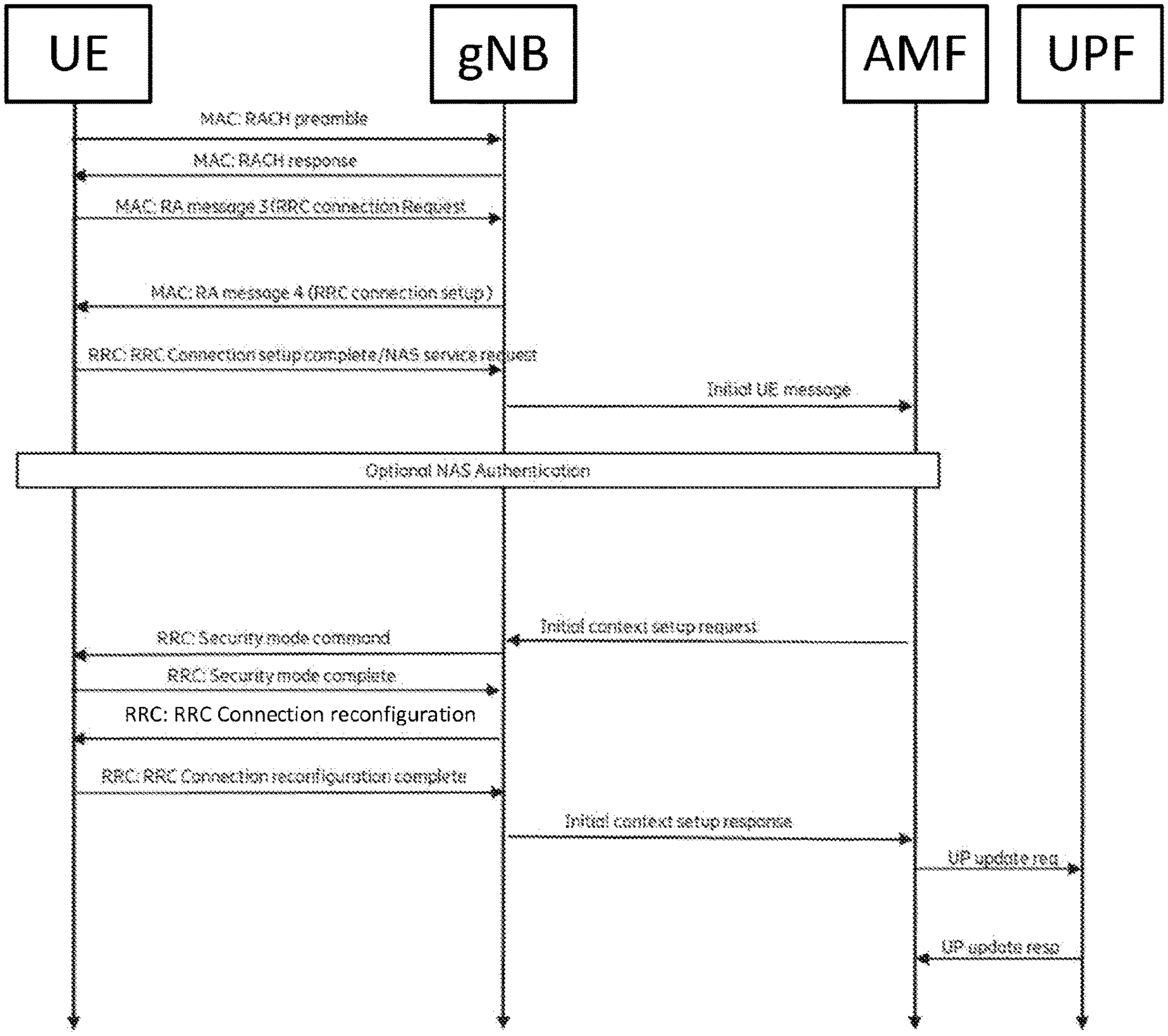
FIGS. 15 and 16 illustrate radio resource control procedures according to some embodiments.
Figure 16:
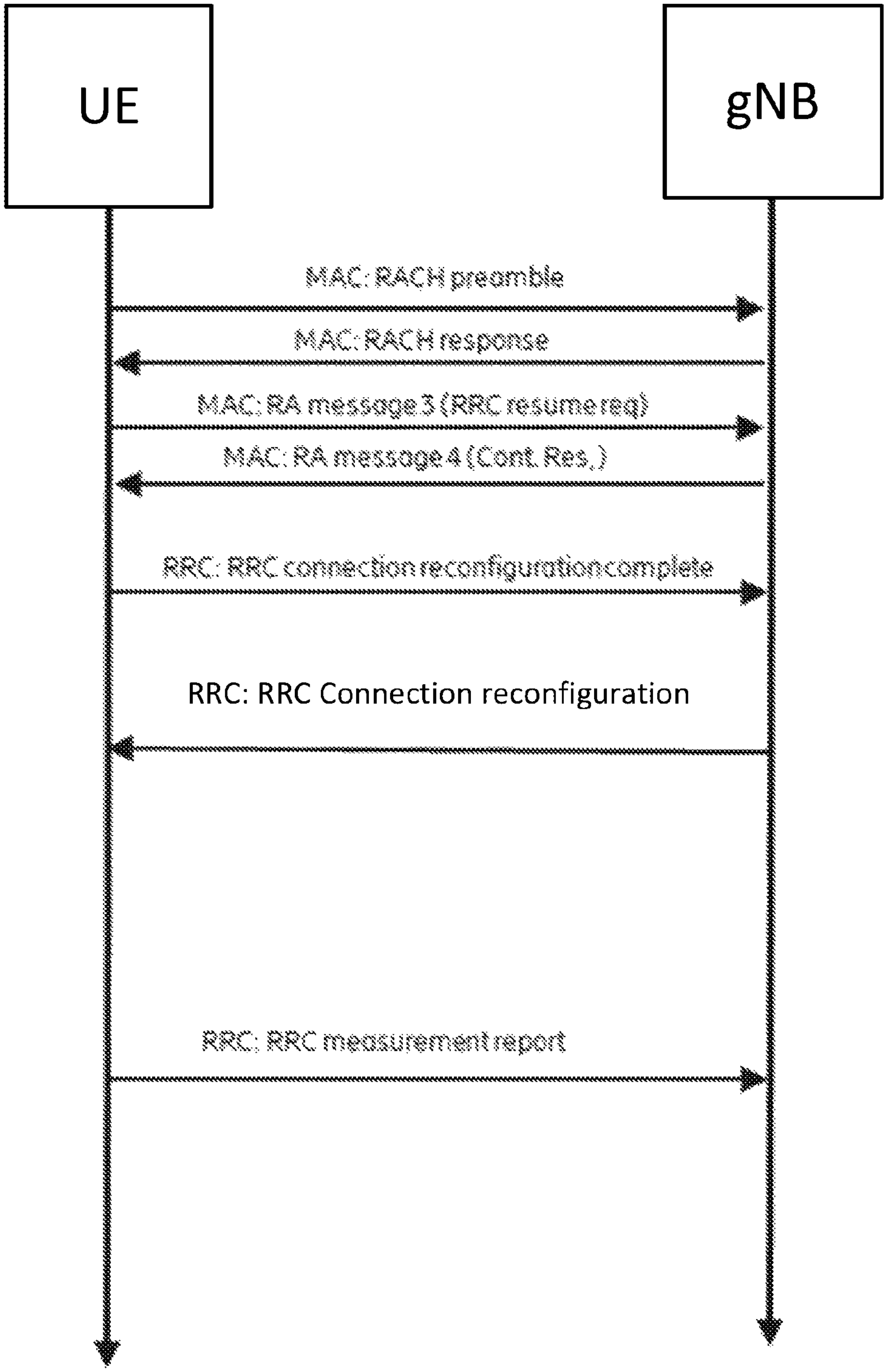

FIG. 15 illustrates message flows between a UE, RAN (gNB) and 5GC (AMF, UPF) for initial setup. The measurement configuration described herein may be carried in the RRC Connection reconfiguration message from the gNB to the UE. Similarly, FIG. 16 illustrates message flows between a UE and RAN (gNB) to resume an RRC connection from an incoming handover. The measurement configuration described may be carried in the RRC Connection reconfiguration message from the gNB to the UE.

Figure 17:
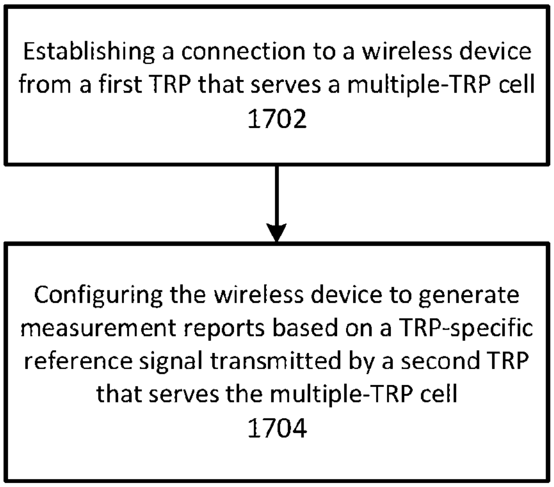
FIG. 17 is a flowchart of operations that can be performed by a TRP according to some embodiments.

FIG. 17 illustrates operations of a TRP according to some embodiments. Referring to FIG. 17, a method of operating a network node, such as a TRP 20, according to some embodiments includes establishing (block 1702) a connection to a wireless device from a first transmission/reception point, TRP, that serves a multiple-TRP cell, and configuring (block 1704) the wireless device to generate measurement reports based on a TRP-specific reference signal transmitted by a second TRP that serves the multiple-TRP cell.

Configuring the wireless device to generate measurement reports based on the TRP-specific reference signal transmitted by the second TRP that serves the multiple-TRP cell may include configuring the wireless device to generate a measurement report in response to occurrence of an entering condition when a difference between a signal power of the TRP-specific reference signal and a signal power of a multiple-TRP reference signal associated with the multiple-TRP cell rises above a first threshold, and in response to occurrence of a leaving condition when the difference between the signal power of the TRP-specific reference signal and the signal power of the multiple-TRP reference signal drops below a second threshold.

In some embodiments, the first threshold and the second threshold may be different levels.

Each of the TRP-specific reference signal and the multiple-TRP reference signal may include a synchronization signal, and each of the signal power of the TRP-specific reference signal and the signal power of the multiple-TRP reference signal comprises a synchronization signal received signal reference power, SS-RSRP.

The multiple-TRP reference signal associated with the multiple-TRP cell may include a composite signal generated by a plurality of TRPs that serve the multiple-TRP cell.

The method may further include receiving a measurement report from the wireless device, and initiating a multiple-TRP mobility procedure for the wireless device in response to the measurement report.

In some embodiments, initiating the multiple-TRP mobility procedure includes adding or removing a secondary sector carrier between the wireless device and the second TRP in response to the measurement report.

The method may further include maintaining a connection between the multiple-TRP cell and the wireless device until the occurrence of a layer 3 handover of the wireless device to a neighboring cell.

In some embodiments, the reference signal transmitted by the second TRP is associated with a TRP-specific cell served by the second TRP.

In some embodiments, configuring the wireless device to generate measurement reports based on the TRP-specific reference signal transmitted by the second TRP that serves the multiple-TRP cell includes configuring the wireless device with a list of physical cell identifiers, PCI, and/or synchronization signal blocks, SSB, associated with of cells for which generation of measurement reports should be triggered.

Figure 18:
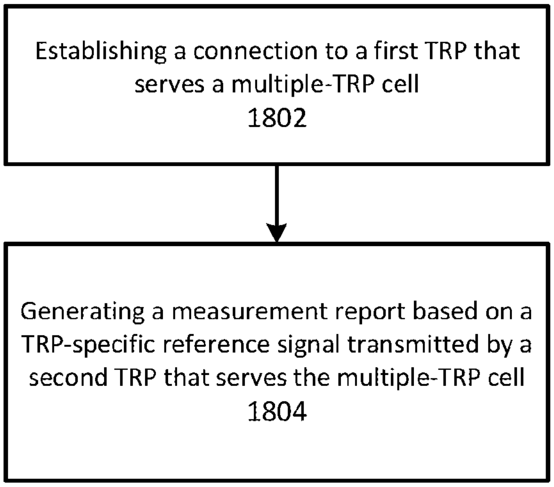
FIG. 18 is a flowchart of operations that can be performed by a wireless device according to some embodiments.

FIG. 18 illustrates operations of a wireless device 10 according to some embodiments. Referring to FIG. 18, a method of operating a wireless device 10 according to some embodiments includes establishing (block 1802) a connection to a first transmission/reception point, TRP, that serves a multiple-TRP cell, and generating (block 1804) a measurement report based on a TRP-specific reference signal transmitted by a second TRP that serves the multiple-TRP cell.

In some embodiments, the wireless device is configured to generate measurement reports based on a comparison of a signal power of the TRP-specific reference signal transmitted by the second TRP that serves the multiple-TRP cell and a signal power of a multiple-TRP reference signal associated with the multiple-TRP cell. The multiple-TRP reference signal may be a composite reference signal transmitted by multiple TRPs.

In some embodiments, the wireless device is configured to generate a measurement report in response to occurrence of an entering condition when a difference between the signal power of the TRP-specific reference signal and a signal power of the multiple-TRP reference signal rises above a first threshold and in response to occurrence of a leaving condition when a difference between the signal power of the TRP-specific reference signal and the signal power of the multiple-TRP reference signal drops below a second threshold. In some embodiments, the first threshold and the second threshold are different levels.

The may further include transmitting a measurement report from the wireless device to the first TRP, and receiving a command from the TRP initiating a multiple-TRP mobility procedure for the wireless device in response to the measurement report.

In some embodiments, the multiple-TRP mobility procedure includes adding or removing a secondary sector carrier between the wireless device and the second TRP in response to the measurement report.

The method may further include maintaining a connection between the multiple-TRP cell and the wireless device until the occurrence of a layer 3 handover of the wireless device to a neighboring cell.

In some embodiments, the reference signal transmitted by the second TRP is associated with a TRP-specific cell served by the second TRP.

In some embodiments, the wireless device is configured to generate measurement reports based on the TRP-specific reference signal transmitted by the second TRP that serves the multiple-TRP cell based on a list of physical cell identifiers, PCI, and/or synchronization signal blocks, SSBS, associated with cells for which generation of measurement reports should be triggered.

Figure 19:
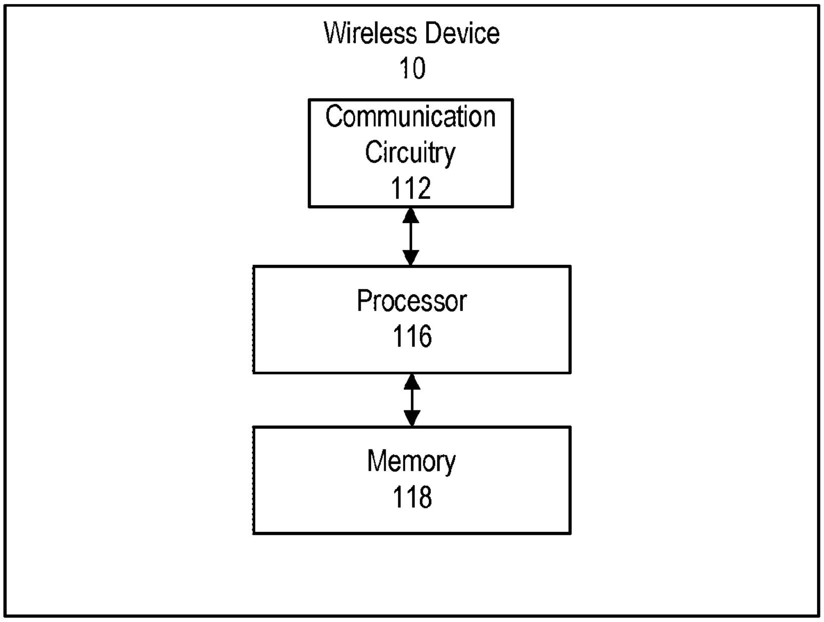
FIG. 19 is a block diagram of a wireless device according to some embodiments.

FIG. 19 depicts an example of a wireless device 10 of a wireless communication network configured to provide wireless communication according to embodiments of inventive concepts. A wireless device 10 may also be referred to herein as a "user equipment," "UE", "wireless communication device" or simply "device." As shown, the wireless device 10 may include a communication circuitry 112 (also referred to as a transceiver) including a transmitter and a receiver configured to provide uplink and downlink radio communications with wireless devices, such as radio access network nodes, TRPs, etc. The wireless device 10 may also include a processor circuit 116 (also referred to as a processor) coupled to the transceiver circuitry 112, and a memory circuit 118 (also referred to as memory) coupled to the processor circuit 116. The memory circuit 118 may include computer readable program code that when executed by the processor circuit 116 causes the processor circuit to perform operations according to embodiments disclosed herein. According to other embodiments, processor circuit 116 may be defined to include memory so that a separate memory circuit is not required.

Operations of the wireless device 10 may be performed by processor 116 and/or transceiver 112. For example, the processor 116 may control transceiver 112 to transmit uplink communications through transceiver 112 over a radio interface to one or more network nodes and/or to receive downlink communications through transceiver 112 from one or more network nodes over a radio interface. Moreover, modules may be stored in memory 118, and these modules may provide instructions so that when instructions of a module are executed by processor 116, processor 116 performs respective operations (e.g., operations discussed above with respect to example embodiments).

Accordingly, a wireless device 10 according to some embodiments includes a processor circuit 116, a transceiver 112 coupled to the processor circuit, and a memory 118 coupled to the processor circuit, the memory including machine readable program instructions that, when executed by the processor circuit, cause the UE to perform operations described above.

Some embodiments provide computer-program product comprising a non-transitory computer-readable medium having stored thereon a computer program that, when executed by the processor 116, causes the wireless device 100 to perform operations as described herein.

Referring to FIGS. 18 and 19, a wireless device 10 according to some embodiments includes a processing circuitry 116, and a memory 118 coupled to the processing circuitry. The memory includes computer readable instructions that when executed by the processing circuitry cause the processing circuitry to perform operations of establishing (block 1802) a connection to a first transmission/reception point, TRP, that serves a multiple-TRP cell, and generating (block 1804) a measurement report based on a TRP-specific reference signal transmitted by a second TRP that serves the multiple-TRP cell.

Still referring to FIGS. 18 and 19, a wireless device 10 according to some embodiments is adapted to perform operations of establishing (block 1802) a connection to a first transmission/reception point, TRP, that serves a multiple-TRP cell, and generating (block 1804) a measurement report based on a TRP-specific reference signal transmitted by a second TRP that serves the multiple-TRP cell.

Some embodiments provide a computer program product including a non-transitory storage medium including program code to be executed by processing circuitry of a wireless device, whereby execution of the program code causes the network node to perform operations of establishing (block 1802) a connection to a first transmission/reception point, TRP, that serves a multiple-TRP cell, and generating (block 1804) a measurement report based on a TRP-specific reference signal transmitted by a second TRP that serves the multiple-TRP cell.

Figure 20:
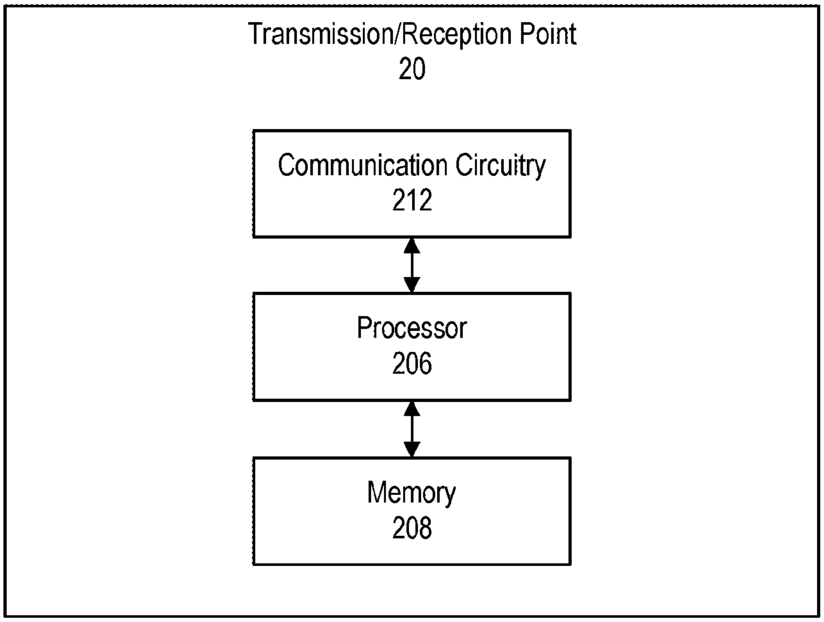
FIG. 20 is a block diagram of a TRP according to some embodiments.

FIG. 20 is a block diagram of a network node that may implement a TRP 20 according to some embodiments. As shown, the TRP 20 includes a communication circuitry 112 (also referred to as a transceiver) including a transmitter and a receiver configured to provide uplink and downlink radio communications with wireless devices. The TRP 20 further includes a processor circuit 206 and a memory 208 coupled to the processor circuit. The memory 208 includes machine-readable computer program instructions that, when executed by the processor circuit, cause the processor circuit to perform some of the operations described herein.

The memory circuit 208 may include computer readable program code that when executed by the processor circuit 206 causes the processor circuit to perform operations according to embodiments disclosed herein. According to other embodiments, processor circuit 206 may be defined to include memory so that a separate memory circuit is not required.

Operations of the network node 200 may be performed by processor 206 and/or network interface 204. For example, processor 206 may control communication circuitry 212 to transmit communications through network interface 204 to one or more wireless devices. Moreover, modules may be stored in memory 208, and these modules may provide instructions so that when instructions of a module are executed by processor 206, processor 206 performs respective operations. In addition, a structure similar to that of FIG. 20 may be used to implement other network nodes. Moreover, network nodes discussed herein may be implemented as virtual network nodes.

Some embodiments provide computer-program product comprising a non-transitory computer-readable medium having stored thereon a computer program that, when executed by the processor 206, causes the TRP 20 to perform operations as described herein.

Referring to FIGS. 17 and 20, a network node, such as a TRP 20, according to some embodiments includes a processing circuitry 206, and a memory 208 coupled to the processing circuitry. The memory includes computer readable instructions that when executed by the processing circuitry cause the processing circuitry to perform operations of establishing (block 1702) a connection to a wireless device from a first transmission/reception point, TRP, that serves a multiple-TRP cell, and configuring (block 1704) the wireless device to generate measurement reports based on a TRP-specific reference signal transmitted by a second TRP that serves the multiple-TRP cell.

Still referring to FIGS. 17 and 20, a network node, such as a TRP 20, according to some embodiments is adapted to perform operations of establishing (block 1702) a connection to a wireless device from a first transmission/reception point, TRP, that serves a multiple-TRP cell, and configuring (block 1704) the wireless device to generate measurement reports based on a TRP-specific reference signal transmitted by a second TRP that serves the multiple-TRP cell.

Some embodiments provide a computer program product including a non-transitory storage medium including program code to be executed by processing circuitry of a network node, whereby execution of the program code causes the network node to perform operations of establishing (block 1702) a connection to a wireless device from a first transmission/reception point, TRP, that serves a multiple-TRP cell, and configuring (block 1704) the wireless device to generate measurement reports based on a TRP-specific reference signal transmitted by a second TRP that serves the multiple-TRP cell.

Figure 21:
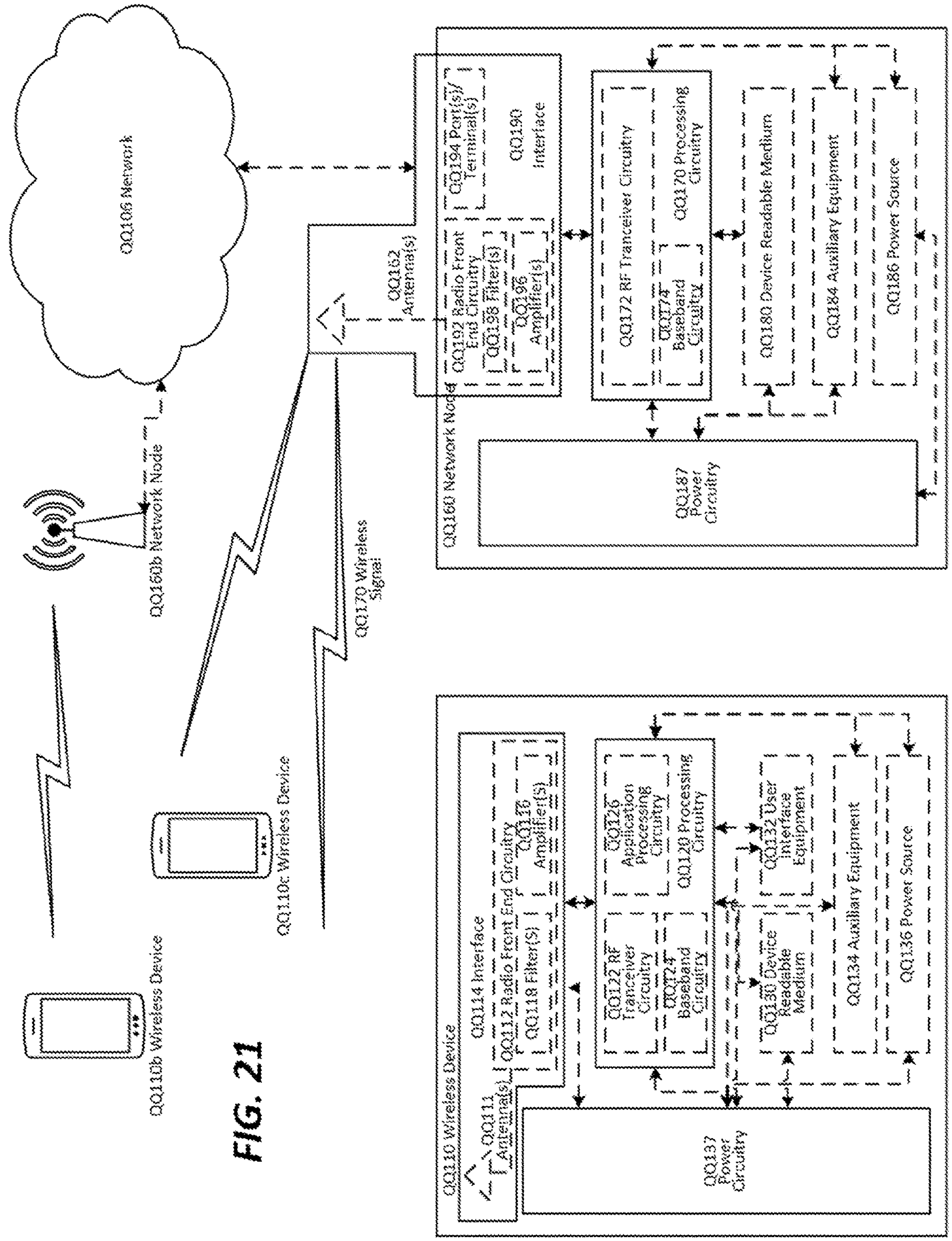
FIG. 21 illustrates elements of a wireless communication system according to some embodiments.

FIG. 21 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 21. For simplicity, the wireless network of FIG. 21 only depicts network QQ106, network nodes QQ160 and QQ160*b*, and WDs QQ110, QQ110*b*, and QQ110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 21, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 21 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ192 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 21 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ112 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/ or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Further Definitions

Acronym Definition
AMF Access and Management Function
CA Carrier Aggregation
DC Dual Connectivity
DL Downlink
HO Handover
LTE Long Term Evolution
MIB Master Information Block
MIMO Multiple Input Multiple Output
NR New Radio
NW Network
OFDMA Orthogonal Frequency-Division Multiple Access
PCI Physical Cell Identity
PRACH Physical Random Access Channel
PSS Primary Synchronization Signal
RACH Random Access Channel
RAN Radio Access Network
RMSI Remaining Minimum System Information
RRC Radio Resource Control
SCS Subcarrier Spacing
SFN Single Frequency Network
SSB Synchronization Signal Block
SSS Secondary Synchronization Signal
TAC Tracking Area Code
TRP Transmission/Reception Point
UE User Equipment
UL Uplink
UPF User Plane Function

REFERENCES

[1] 3GPP TS 38.331 v. 15.9.0

What is claimed is:

1. A method of operating a network node, comprising:

establishing a connection to a wireless device from a first transmission/reception point (TRP) that serves a multiple-TRP cell; and configuring the wireless device to generate measurement reports based on a TRP-specific reference signal transmitted by a second TRP that serves the multiple-TRP cell, when a signal power of a reference signal broadcast by a neighbor cell comes within a first threshold of a signal power of a corresponding reference signal broadcast by a serving cell and a difference remains greater than the first threshold for a duration of a time-to-trigger (TTT) period, the measurement reports are triggered to be generated, wherein the wireless device is configured to generate a measurement report in response to occurrence of an entering condition when a difference between a signal power of the TRP-specific reference signal and a signal power of a multiple-TRP reference signal associated with the multiple-TRP cell rises above a third threshold.

2. The method of claim 1, wherein configuring the wireless device to generate measurement reports based on the TRP-specific reference signal further comprises configuring the wireless device to generate a measurement report in response to occurrence of a leaving condition when the difference between the signal power of the TRP-specific reference signal and the signal power of the multiple-TRP reference signal associated with the multiple-TRP cell drops below a second threshold.

3. The method of claim 1, wherein each of the TRP-specific reference signal and the multiple-TRP reference signal comprises a synchronization signal, and wherein each of the signal power of the TRP-specific reference signal and the signal power of the multiple-TRP reference signal comprises a synchronization signal received signal reference power (SS-RSRP).

4. The method of claim 1, wherein the multiple-TRP reference signal associated with the multiple-TRP cell comprises a composite signal generated by a plurality of TRPs that serve the multiple-TRP cell.

5. The method of claim 1, further comprising:

receiving a measurement report from the wireless device; and initiating a multiple-TRP mobility procedure for the wireless device in response to the measurement report.

6. The method of claim 5, wherein initiating the multiple-TRP mobility procedure comprises adding or removing a secondary sector carrier between the wireless device and the second TRP in response to the measurement report.

7. The method of claim 1, further comprising: maintaining the connection between the multiple-TRP cell and the wireless device until the occurrence of a layer 3 handover of the wireless device to a neighboring cell.

8. The method of claim 1, wherein the TRP-specific reference signal transmitted by the second TRP is associated with a TRP-specific cell served by the second TRP.

9. The method of claim 1, wherein configuring the wireless device to generate measurement reports based on the TRP-specific reference signal transmitted by the second TRP that serves the multiple-TRP cell comprises configuring the wireless device with a list of physical cell identifiers (PCI) and/or synchronization signal blocks (SSB) associated with of cells for which generation of measurement reports should be triggered.

10. The method of claim 1, wherein the second threshold and the third threshold are different levels.

11. A method of operating a wireless device, comprising:

establishing a connection to a first transmission/reception point (TRP) that serves a multiple-TRP cell; and generating a measurement report based on a TRP-specific reference signal transmitted by a second TRP that serves the multiple-TRP cell, when a signal power of a reference signal broadcast by a neighbor cell comes within a first threshold of a signal power of a corresponding reference signal broadcast by a serving cell and a difference remains greater than the first threshold for a duration of a time-to-trigger (TTT) period, the measurement reports are triggered to be generated, wherein the wireless device is configured to generate a measurement report in response to occurrence of an entering condition when a difference between the signal power of the TRP-specific reference signal and a signal power of the multiple-TRP reference signal rises above a second threshold, and in response to occurrence of a leaving condition when a difference between the signal power of the TRP-specific reference signal and the signal power of the multiple-TRP reference signal drops below a third threshold.

12. The method of claim 11, wherein the wireless device is configured to generate measurement report based on a comparison of a signal power of the TRP-specific reference signal transmitted by the second TRP that serves the multiple-TRP cell and a signal power of a multiple-TRP reference signal associated with the multiple-TRP cell.

13. The method of claim 12, wherein the multiple-TRP reference signal associated with the multiple-TRP cell comprises a composite signal generated by a plurality of TRPs that serve the multiple-TRP cell.

14. The method of claim 11, wherein the second threshold and the third threshold are different levels.

15. The method of claim 11, further comprising:

transmitting a measurement report from the wireless device to the first TRP; and receiving a command from the TRP initiating a multiple-TRP mobility procedure for the wireless device in response to the measurement report.

16. The method of claim 15, wherein the multiple-TRP mobility procedure comprises adding or removing a secondary sector carrier between the wireless device and the second TRP in response to the measurement report.

17. The method of claim 11, further comprising: maintaining the connection between the multiple-TRP cell and the wireless device until the occurrence of a layer 3 handover of the wireless device to a neighboring cell.

18. The method of claim 11, wherein the wireless device is configured to generate measurement reports based on the TRP-specific reference signal transmitted by the second TRP that serves the multiple-TRP cell based on a list of physical cell identifiers (PCI) and/or synchronization signal blocks (SSBS) associated with cells for which generation of measurement reports should be triggered.

* * * * *